US012307326B2

(12) United States Patent
Reitmeyer et al.

(10) Patent No.: US 12,307,326 B2
(45) Date of Patent: May 20, 2025

(54) INTERACTIVE REGION BASED ON OPTICALLY READABLE CODE

(71) Applicant: RESI MEDIA LLC, Allen, TX (US)

(72) Inventors: Bradley Reitmeyer, Allen, TX (US);
Robert Bertram, Pendleton, IN (US);
Christopher Joel Ribble, Garland, TX (US); Pete Swulius, Dallas, TX (US)

(73) Assignee: RESI MEDIA, LLC, Allen, TX (US)

( * ) Notice: Subject to any disclaimer, the term of this patent is extended or adjusted under 35 U.S.C. 154(b) by 47 days.

(21) Appl. No.: 18/473,685

(22) Filed: Sep. 25, 2023

(65) Prior Publication Data

US 2025/0103835 A1    Mar. 27, 2025

(51) Int. Cl.
| | | |
|---|---|---|
| *G06K 7/14* | (2006.01) | |
| *H04N 21/234* | (2011.01) | |
| *H04N 21/431* | (2011.01) | |
| *H04N 21/472* | (2011.01) | |
| *H04N 21/6543* | (2011.01) | |

(52) U.S. Cl.
CPC ..... *G06K 7/1443* (2013.01); *H04N 21/23418* (2013.01); *H04N 21/4312* (2013.01); *H04N 21/472* (2013.01); *H04N 21/6543* (2013.01)

(58) Field of Classification Search
CPC ........... G06K 7/1443; H04N 21/23418; H04N 21/4312; H04N 21/472; H04N 21/6543
See application file for complete search history.

(56) References Cited

U.S. PATENT DOCUMENTS

| | | | |
|---|---|---|---|
| 9,280,515 B2* | 3/2016 | Gaede | H04N 21/8352 |
| 10,237,583 B1* | 3/2019 | Allen | H04N 21/23418 |
| 11,049,176 B1* | 6/2021 | Drynan | G06Q 20/123 |
| 11,064,149 B1* | 7/2021 | Paun | H04N 21/8133 |
| 2007/0159522 A1* | 7/2007 | Neven | G06Q 30/02 |
| | | | 348/E7.071 |
| 2012/0206648 A1* | 8/2012 | Casagrande | H04N 21/4524 |
| | | | 235/494 |
| 2012/0272279 A1* | 10/2012 | Lim | H04N 21/8146 |
| | | | 725/109 |
| 2013/0334300 A1* | 12/2013 | Evans | H04N 21/47217 |
| | | | 235/494 |
| 2014/0165104 A1* | 6/2014 | Choi | H04N 21/4383 |
| | | | 725/40 |

(Continued)

*Primary Examiner* — Fernando Alcon

(74) *Attorney, Agent, or Firm* — Schwegman Lundberg & Woessner, P.A.

(57) ABSTRACT

A video server machine initiates an analysis of a video stream to be provided to a player device, and the initiated analysis may be configured to detect an optically readable code appearing within the video stream. The video server machine initiates provision of the video stream to the player device during or after the analysis that is configured to detect the optically readable code within the video stream. In response to the optically readable code being detected, the video server machine generates a command to control the player device, and the generated command indicates the screen location of the optically readable code detected by the analysis. The video server machine then controls the player device by providing the generated command to the player device, and the provided generated command causes the player device to present an interactive region at the screen location of the optically readable code.

42 Claims, 9 Drawing Sheets

(56) References Cited

U.S. PATENT DOCUMENTS

| | | | |
|---|---|---|---|
| 2014/0173657 A1* | 6/2014 | Afentakis | H04N 21/41265 |
| | | | 725/40 |
| 2015/0014417 A1* | 1/2015 | Finlow-Bates | H04N 21/6581 |
| | | | 235/494 |
| 2016/0321502 A1* | 11/2016 | Kamath | G06Q 30/00 |
| 2020/0322677 A1* | 10/2020 | Kovacs | H04N 21/6582 |
| 2021/0365233 A1* | 11/2021 | Grady | G10H 1/0083 |
| 2022/0201369 A1* | 6/2022 | McClendon | H04N 21/23424 |
| 2023/0017614 A1* | 1/2023 | Srinivasa | G06V 20/42 |
| 2023/0209102 A1* | 6/2023 | Choi | H04N 21/472 |
| | | | 725/61 |
| 2023/0281887 A1* | 9/2023 | Wesner | G06V 30/186 |
| | | | 382/182 |
| 2024/0089546 A1* | 3/2024 | DiTullio | H04N 21/4725 |
| 2024/0107105 A1* | 3/2024 | DiTullio | H04N 21/422 |
| 2024/0147021 A1* | 5/2024 | Delaney | H04N 21/8586 |
| 2024/0373086 A1* | 11/2024 | Ross | H04N 21/812 |

* cited by examiner

INTERACTIVE REGION BASED ON OPTICALLY READABLE CODE

TECHNICAL FIELD

The subject matter disclosed herein generally relates to the technical field of special-purpose machines that facilitate video processing, including software-configured computerized variants of such special-purpose machines and improvements to such variants, and to the technologies by which such special-purpose machines become improved compared to other special-purpose machines that facilitate video processing. Specifically, the present disclosure addresses systems and methods to facilitate provision of an interactive region based on an optically readable code.

BACKGROUND

A machine may be configured as a video server (e.g., by suitable hardware, software, or both) to provide one or more video streams to one or more player devices. Another machine may be configured as a player device (e.g., by suitable hardware, software, or both) to access one or more video streams provided by the video server and present (e.g., display) one or more of the accessed video streams to one or more users (e.g., viewers), for example, by causing a display device (e.g., a display screen) to display the presented one or more video streams.

BRIEF DESCRIPTION OF THE DRAWINGS

Some embodiments are illustrated by way of example and not limitation in the figures of the accompanying drawings.

DETAILED DESCRIPTION

Figure 1:
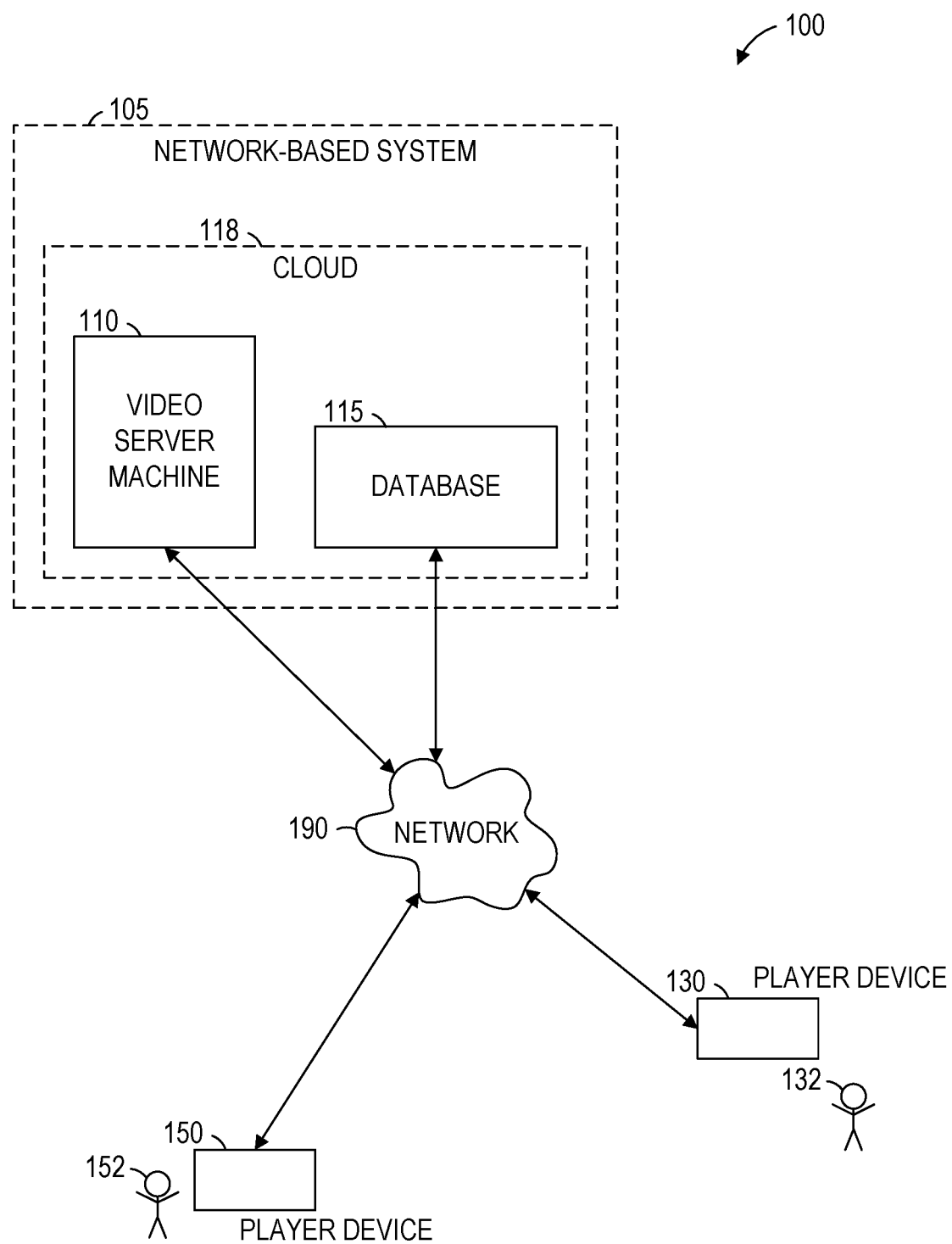
FIG. 1 is a network diagram illustrating a network environment suitable for providing an interactive region based on an optically readable code, according to some example embodiments.

Example methods (e.g., algorithms) facilitate provision of an interactive region based on an optically readable code (e.g., an optically readable code, such as a quick response (QR) code, depicted in a set of one or more video frames within a video stream), and example systems (e.g., special-purpose machines configured by special-purpose software) are configured to facilitate provision of an interactive region based on an optically readable code. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A video server machine may be configured (e.g., by suitable hardware, software, or both) to facilitate provision of an interactive region based on an optically readable code. As configured, the video server machine initiates an analysis of a video stream to be provided to a player device, and the initiated analysis may be configured to detect the optically readable code appearing within the video stream (e.g., the optically readable code being depicted at a screen location throughout a set of one or more video frames within the video stream). The video server machine initiates provision of the video stream to the player device during or after the analysis that is configured to detect the optically readable code within the video stream. In response to the optically readable code being detected in the video stream by the analysis, the video server machine generates a command to control the player device, and the generated command indicates the screen location of the optically readable code detected by the analysis. The video server machine then fully or partly controls the player device by providing the generated command to the player device, and the provided generated command causes the player device to present an interactive region at the screen location of the optically readable code (e.g., throughout the set of one or more video frames that depict the optically readable code) while the player device presents the video stream being provided to the player device. The presented interactive region is activatable (e.g., by clicking, tapping, touching, or other suitable activation input) to initiate an action based on the optically readable code depicted in the set of video frames.

A player device may be configured (e.g., by suitable hardware, software, or both) to facilitate provision of an interactive region based on an optically readable code. As configured, the player device accesses a video stream being provided by a video server (e.g., a video server machine) that is configured to analyze the video stream and detect the optically readable code appearing within the video stream (e.g., the optically readable code being depicted at a screen location throughout a set of one or more video frames within the video stream). The player device receives a command generated by the video server, and the received command indicates the screen location of the optically readable code. The player device then presents, in response to the received command, an interactive region at the screen location of the optically readable code (e.g., throughout the set of video frames that depict the optically readable code) while the player device also presents the accessed video stream that is being provided by the video server. The presented interactive region is activatable (e.g., by clicking, tapping, touching, or other suitable activation input) to initiate an action based on the optically readable code depicted in the set of video frames.

FIG. 1 is a network diagram illustrating a network environment suitable for providing an interactive region based on an optically readable code, according to some example embodiments. The network environment 100 includes a video server machine 110, a database 115, and player devices 130 and 150, all communicatively coupled to each other via a network 190. The video server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the player devices 130 and 150). The video server machine 110 and the player devices 130 and 150 may each be implemented in a special-purpose (e.g., specialized) computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the player device 130 or 150), or any suitable combination thereof (e.g., a human assisted by a machine, or a machine supervised by a human). The user 132 is associated with the player device 130 and may be a user of the player device 130. For example, the player device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the player device 150 and may be a user of the player device 150. As an example, the player device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and player devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the video server machine 110 and the player device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
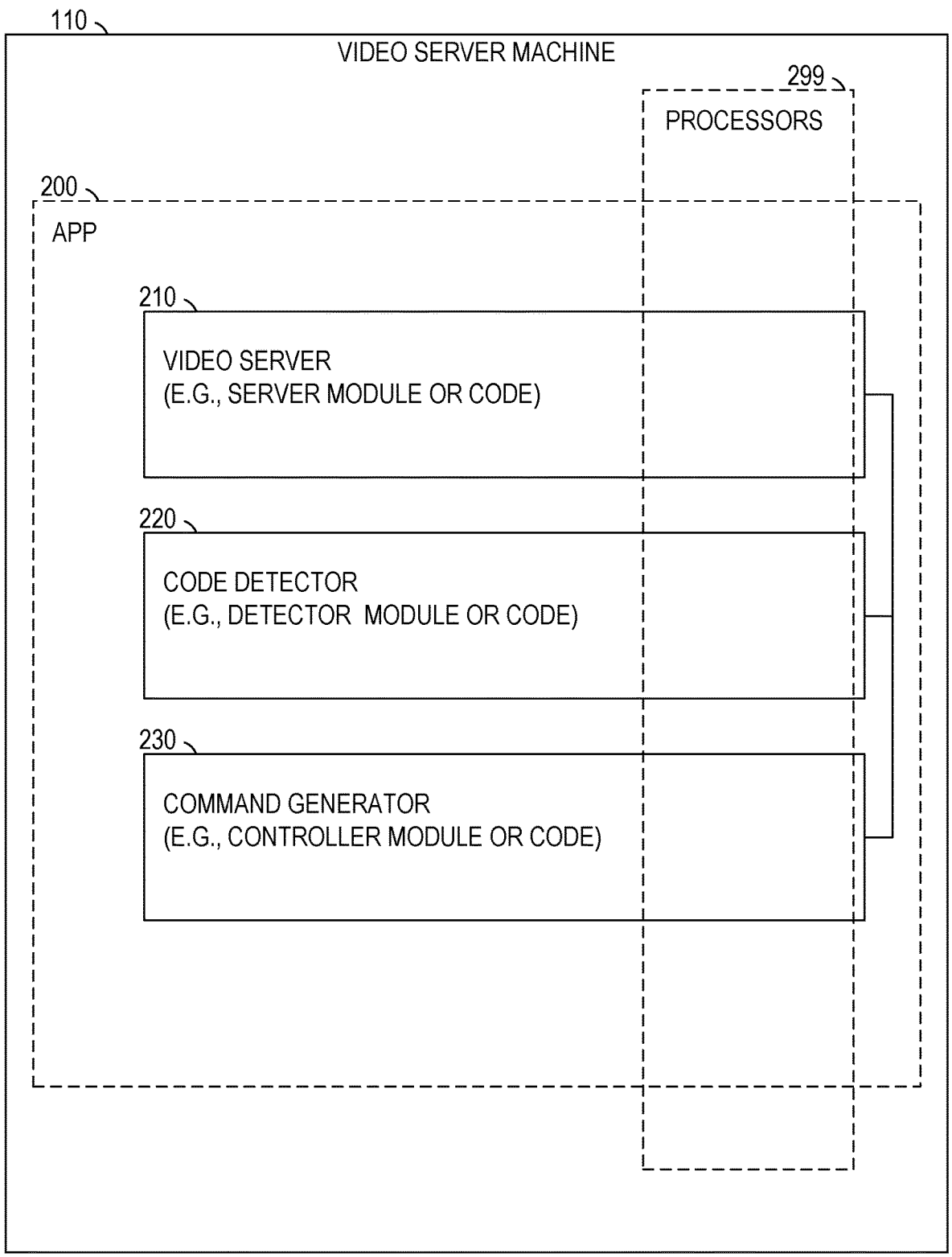
FIG. 2 is a block diagram illustrating components of a video server machine suitable for providing an interactive region based on an optically readable code, according to some example embodiments.

FIG. 2 is a block diagram illustrating components of the video server machine 110, configured to provide an interactive region based on an optically readable code, according to some example embodiments. The video server machine 110 is shown as including a video server 210 (e.g., a server module or code suitable for serving video), a code detector 220 (e.g., a code module or code suitable for detecting optically readable codes), and a command generator 230 (e.g., a controller module or code suitable for controlling one or more player devices, such as the player devices 130 and 150), all configured to communicate with each other (e.g., via a bus, shared memory, or a switch).

As shown in FIG. 2, the video server 210, the code detector 220, and the command generator 230 may form all or part of an app 200 (e.g., a server app) that is stored (e.g., installed) on the video server machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the app 200, the video server 210, the code detector 220, the command generator 230, or any suitable combination thereof.

Any one or more of the components (e.g., modules) described herein (e.g., with respect to FIG. 2) may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
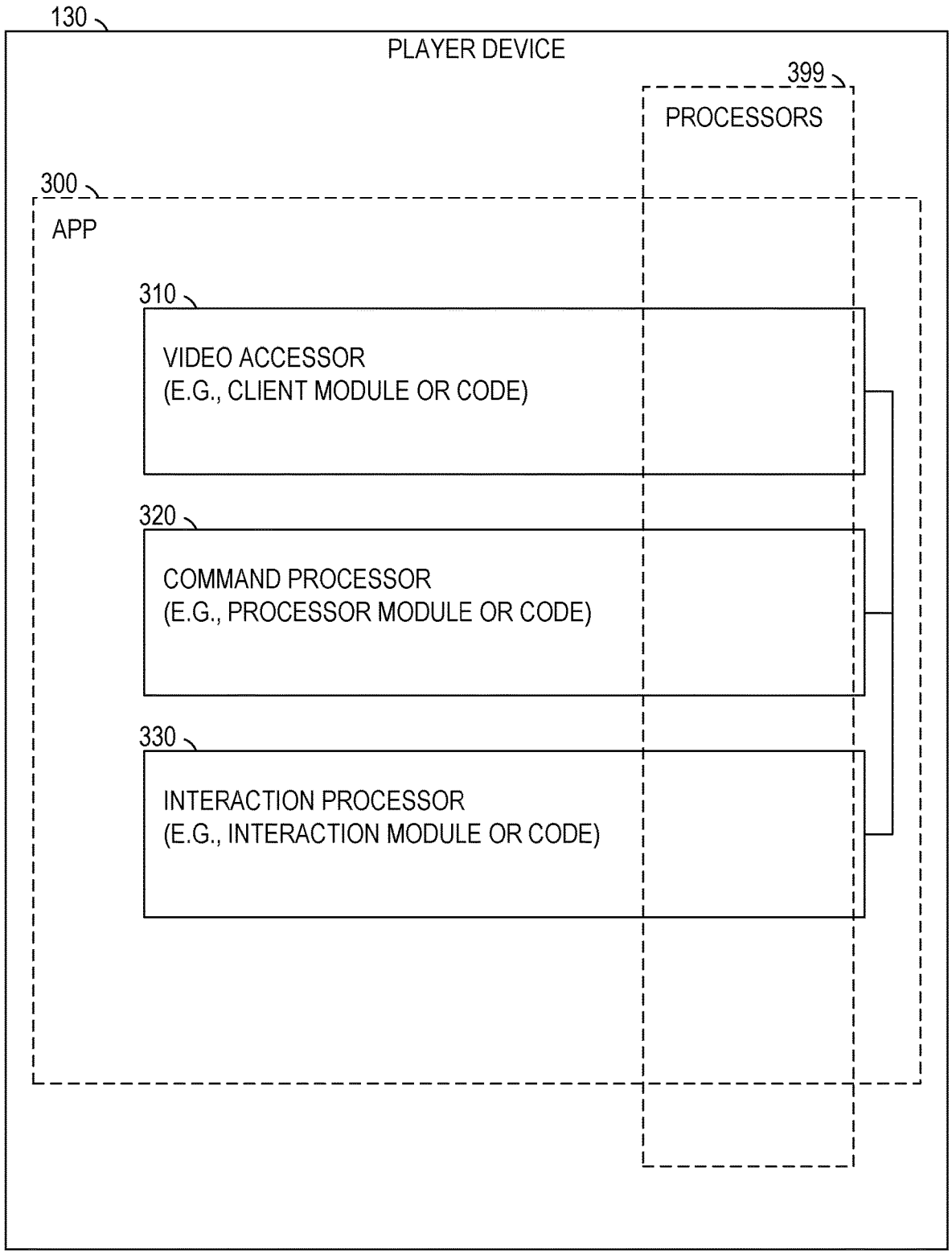
FIG. 3 is a block diagram illustrating components of a player device suitable for providing an interactive region based on an optically readable code, according to some example embodiments.

FIG. 3 is a block diagram illustrating components of the player device 130, configured to provide an interactive region based on an optically readable code, according to some example embodiments. The player device 130 is shown as including a video accessor 310 (e.g., a client module or code suitable for accessing one or more video streams provided by the video server machine 110), a command processor 320 (e.g., a processor module or code suitable for processing one or more commands provided by the video server machine 110), and an interaction processor 330 (e.g., an interaction module or code suitable for processing one or more interactions by a user with an interactive region of presented video, such as an activation of the interactive region), all configured to communicate with each other (e.g., via a bus, shared memory, or a switch).

As shown in FIG. 3, the video accessor 310, the command processor 320, and the interaction processor 330 may form all or part of an app 300 (e.g., a client app) that is stored (e.g., installed) on the player device 130 (e.g., responsive to or otherwise as a result of data being received via the network 190). Furthermore, one or more processors 399 (e.g., hardware processors, digital processors, or any suitable combination thereof) may be included (e.g., temporarily or permanently) in the app 300, the video accessor 310, the command processor 320, the interaction processor 330, or any suitable combination thereof.

Any one or more of the components (e.g., modules) described herein (e.g., with respect to FIG. 3) may be implemented using hardware alone (e.g., one or more of the processors 399) or a combination of hardware and software. For example, any component described herein may physically include an arrangement of one or more of the processors 399 (e.g., a subset of or among the processors 399) configured to perform the operations described herein for that component. As another example, any component described herein may include software, hardware, or both, that configure an arrangement of one or more of the processors 399 to perform the operations described herein for that component. Accordingly, different components described herein may include and configure different arrangements of the processors 399 at different points in time or a single arrangement of the processors 399 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
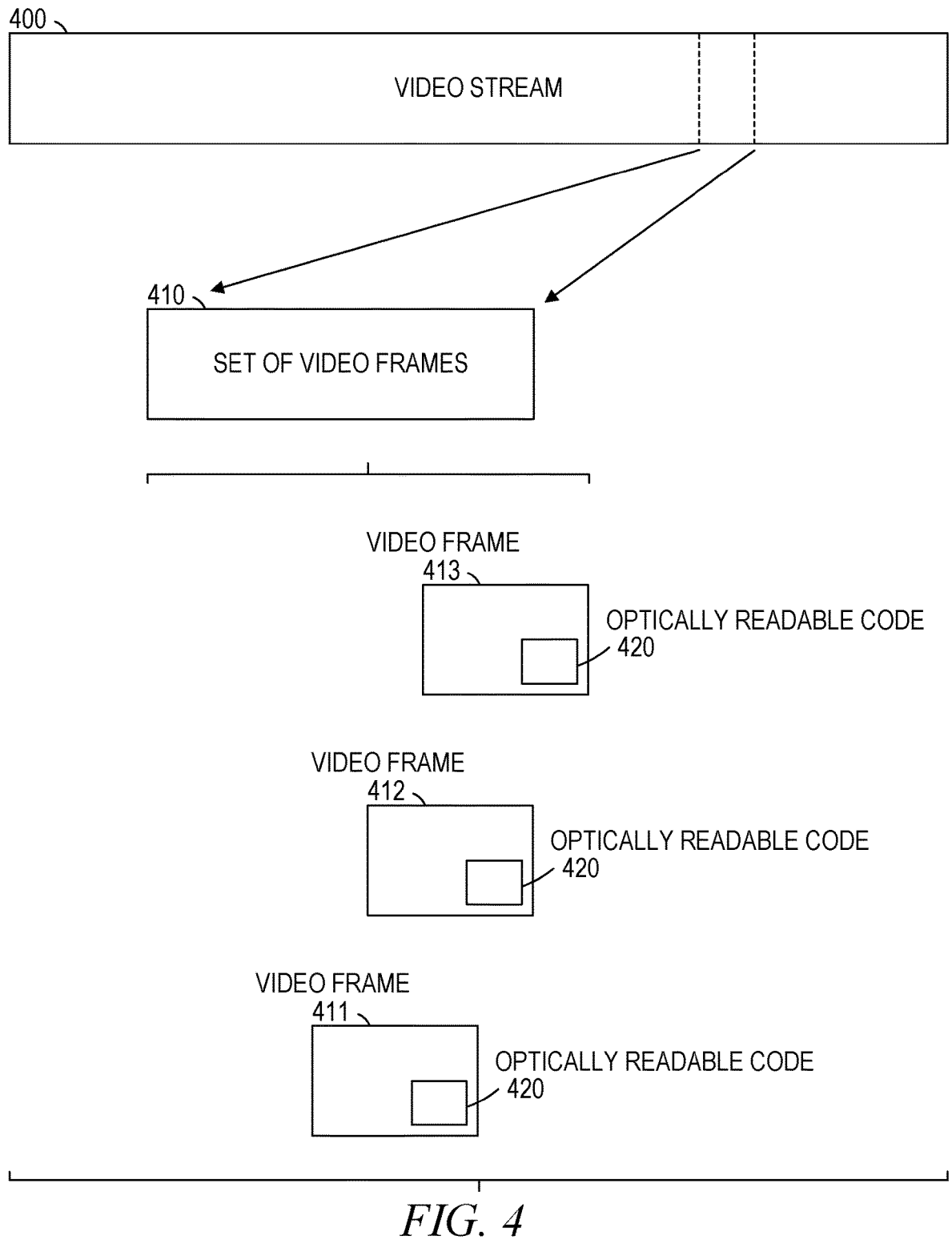
FIG. 4 is a diagram illustrating a video stream in which a set of video frames each depict an optically readable code at a screen location, according to some example embodiments.

FIG. 4 is a diagram illustrating a video stream 400 that includes a set 410 of video frames, and each video frame in the set 410 depicts an optically readable code 420 (e.g., a QR code or a barcode) at a screen location within that video frame, according to some example embodiments. As shown in FIG. 4, the video stream 400 includes video frames, and among the video frames of the video stream 400 is the set 410 of video frames. The set 410 of video frames may include one or more video frames, and in the example embodiments illustrated in FIG. 4, the set 410 includes video frames 411, 412, and 413 (e.g., at least). Throughout the set 410 of video frames, each video frame (e.g., video frames 411, 412, and 413) depicts the optically readable code 420 at a screen location (e.g., a non-moving screen location) within the visible video content of that video frame (e.g., within the viewable picture area of the video frame, as opposed to within metadata of the video frame or within a non-viewable area outside the picture area, such as within a vertical blanking interval or an overscan margin). In some example embodiments, the video stream 400 depicts various video content, and during the set 410 of video frames, the optically readable code 420 appears at the screen location. Outside the set 410 of video frames, the optically readable code 420 may be absent, hidden, or otherwise not visible in the video content of the video stream 400.

Figure 5:
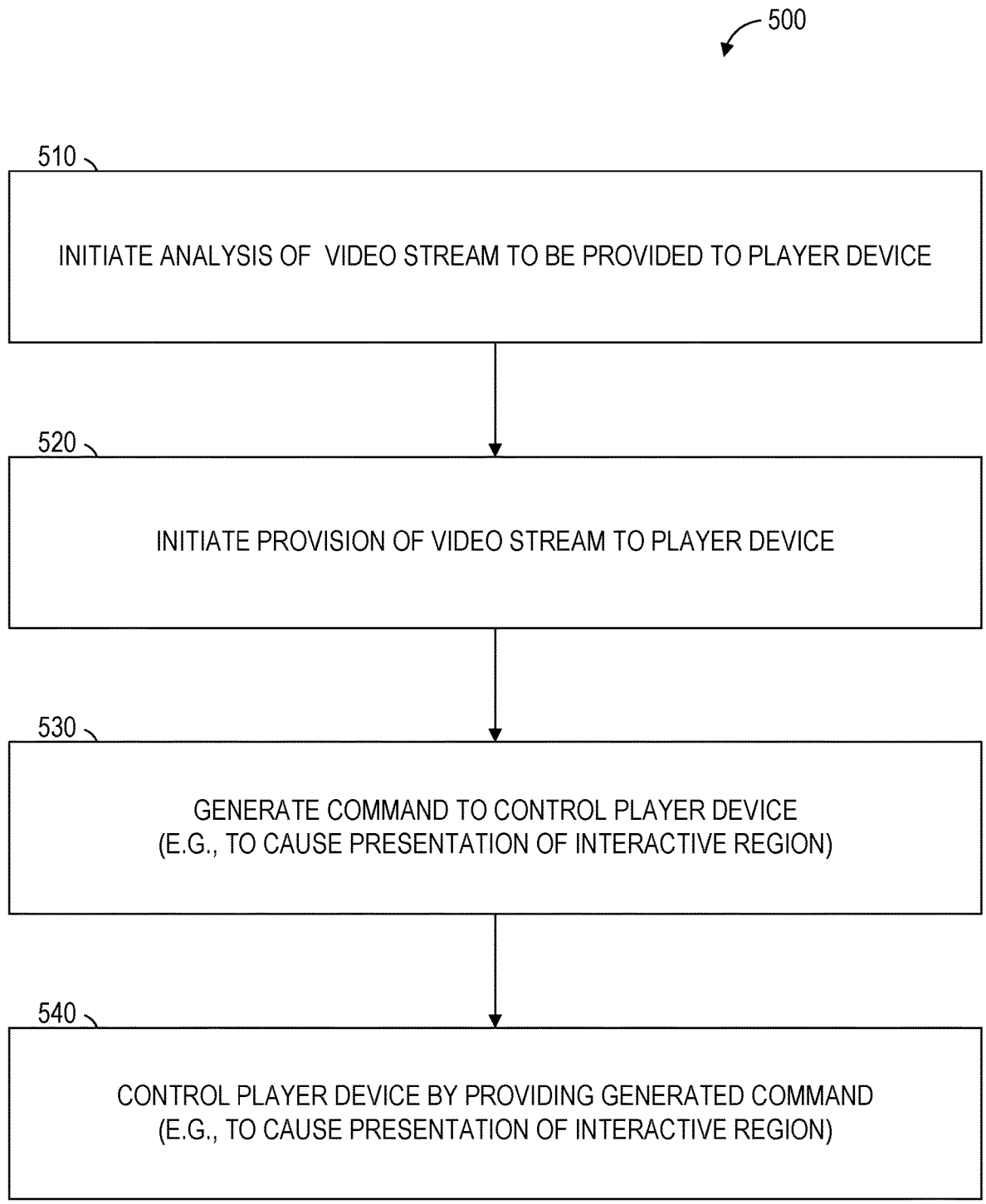
FIGS. 5 and 6 are flowcharts illustrating operations of the video server machine in performing a method of providing an interactive region based on an optically readable code, according to some example embodiments.
Figure 6:
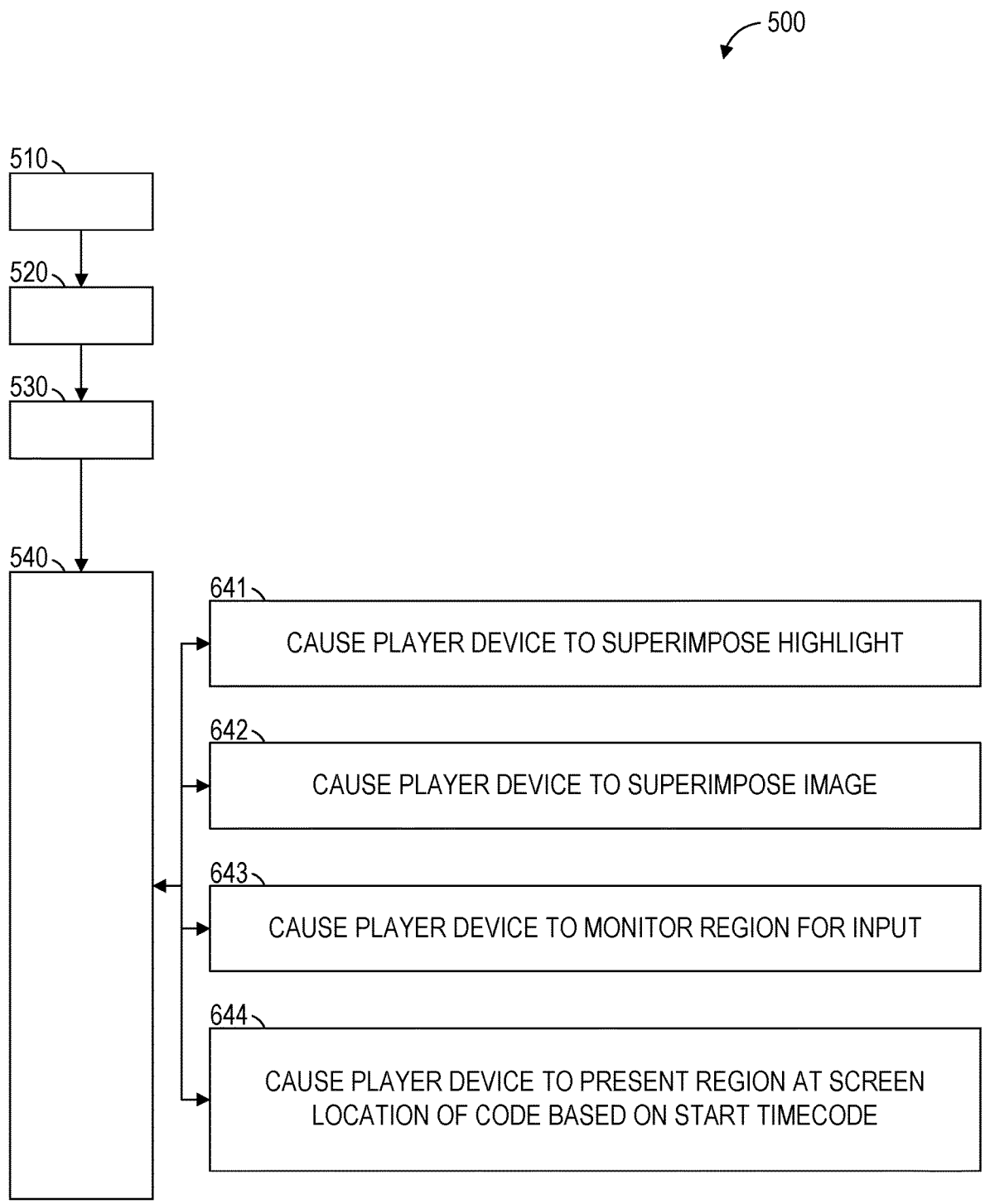

FIGS. 5 and 6 are flowcharts illustrating operations of the video server machine 110 in performing a method 500 of providing an interactive region based on an optically readable code, according to some example embodiments. Operations in the method 500 may be performed by the video server machine 110, using components (e.g., modules) described above with respect to FIG. 2, using one or more processors (e.g., microprocessors or other hardware processors), or using any suitable combination thereof. As shown in FIG. 5, the method 500 includes operations 510, 520, 530, and 540.

In operation 510, code detector 220 initiates (e.g., launches, triggers, or otherwise begins performance of) an analysis of the video stream 400, which is to be provided to the player device 130. The analysis is configured (e.g., by suitable image processing software, hardware, or both) to detect the optically readable code 420, which is depicted at a screen location throughout the set 410 of video frames within the video stream 400.

In operation 520, the video server 210 initiates (e.g., launches, triggers, or otherwise begins performance of) provision of the video stream 400 to the player device 130 (e.g., via the network 190) during the analysis initiated in operation 510. As mentioned, the analysis is configured to detect appearance of the optically readable code 420 within the video stream 400.

In operation 530, the command generator 230 generates (e.g., creates, builds, or otherwise forms) a command that is configured to control the player device 130. The generated command indicates the screen location of the optically readable code 420 that was detected by the analysis initiated in operation 510. As noted above, the detected optically readable code 420 is depicted throughout the set 410 of video frames within the video stream 400.

In operation 540, the command generator 230 controls (e.g., commands, manages, or otherwise influences behavior of) the player device 130 by providing the command generated in operation 530 to the player device 130 (e.g., via the network 190). The provided command causes the player device 130 to present an interactive region (e.g., after generating the interactive region, configuring the interactive region, or both) at the screen location of the optically readable code 420. The provided command may cause the player device 130 to present the interactive region throughout the entire set 410 of video frames that depict the optically readable code 420, and the provided command may cause the player device 130 to present the interactive region while the player device 130 also presents (e.g., displays) the video stream 400 that is being provided to the player device 130 (e.g., by the video server 210).

The presented interactive region is activatable to initiate an action based on the optically readable code 420 depicted in the set 410 of video frames within the video stream 400. In some example embodiments, the optically readable code 420 encodes the action (e.g., encodes an identifier of the action) to be initiated in response to activation of the interactive region. In such example embodiments, the provided command indicates the action encoded by the optically readable code 420, and in response to detection of an activation input within the presented interactive region, the player device 130 (e.g., one or more of its processors 399) initiates the action encoded by the optically readable code 420.

In certain example embodiments, the optically readable code 420 encodes a network location (e.g., encodes a network address or other network locator) of data to be obtained and to be presented in response to activation of the interactive region. In such example embodiments, the provided command indicates the network location encoded by the optically readable code 420, and in response to detection of an activation input within the interactive region, the player device 130 (e.g., one or more of its processors 399) obtains and presents the data whose network location is encoded by the optically readable code 420.

As shown in FIG. 6, in addition to any one or more of the operations previously described for the method 500, the method 500 may include one or more of operations 641, 642, 643, and 644. One or more of operations 641, 642, 643, and 644 may be performed as part (e.g., a precursor task, a subroutine, or a portion) of operation 540, in which the command generator 230 controls the player device 130 by providing the command generated in operation 530.

In operation 641, the command generated in operation 530 indicates that the optically readable code 420 is to be highlighted, and the command generator 230 provides the generated command to the player device 130, which causes the player device 130 to superimpose a highlight over the optically readable code 420, the presented interactive region, or both.

In operation 642, the command generated in operation 530 indicates that the optically readable code 420 is to be replaced with a specified image (e.g., provided, identified, or otherwise specified by the command), and the command generator 230 provides the generated command to the player device 130, which causes the player device 130 to superimpose the specified image over the optically readable code 420, the presented interactive region, or both.

In operation 643, the command generated in operation 530 causes the player device 130 to monitor the interactive region for an activation input caused by a viewer (e.g., user 132) of the video stream 400, and the command generator 230 provides the generated command to the player device 130, which causes the player device 130 to monitor the presented interactive region and, in response to detection of the activation input within the interactive region, to initiate the action based on the optically readable code 420 depicted in the set 410 of video frames within the video stream 400.

In operation 644, the command generated in operation 530 indicates a start timecode of the set 410 of video frames that depict the optically readable code 420 within the video stream 400, and the command generator 230 provides the generated command to the player device 130, which causes the player device 130 to present the interactive region at the screen location of the optically readable code 420 based on (e.g., in response to, or triggered by) the start timecode of the set 410 of video frames.

Figure 7:
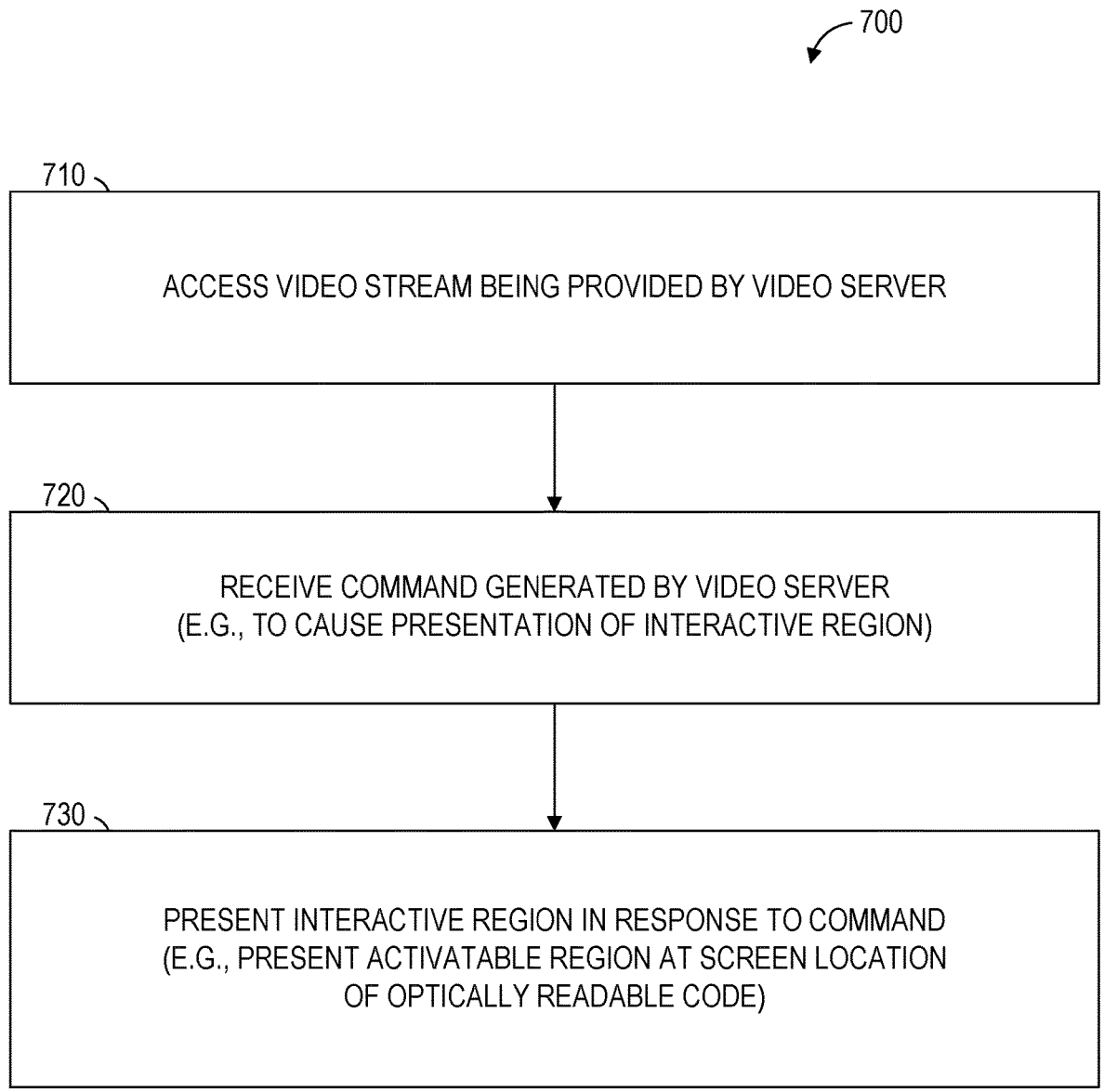
FIGS. 7 and 8 are flowcharts illustrating operations of the player device in performing a method of providing an interactive region based on an optically readable code, according to some example embodiments.
Figure 8:
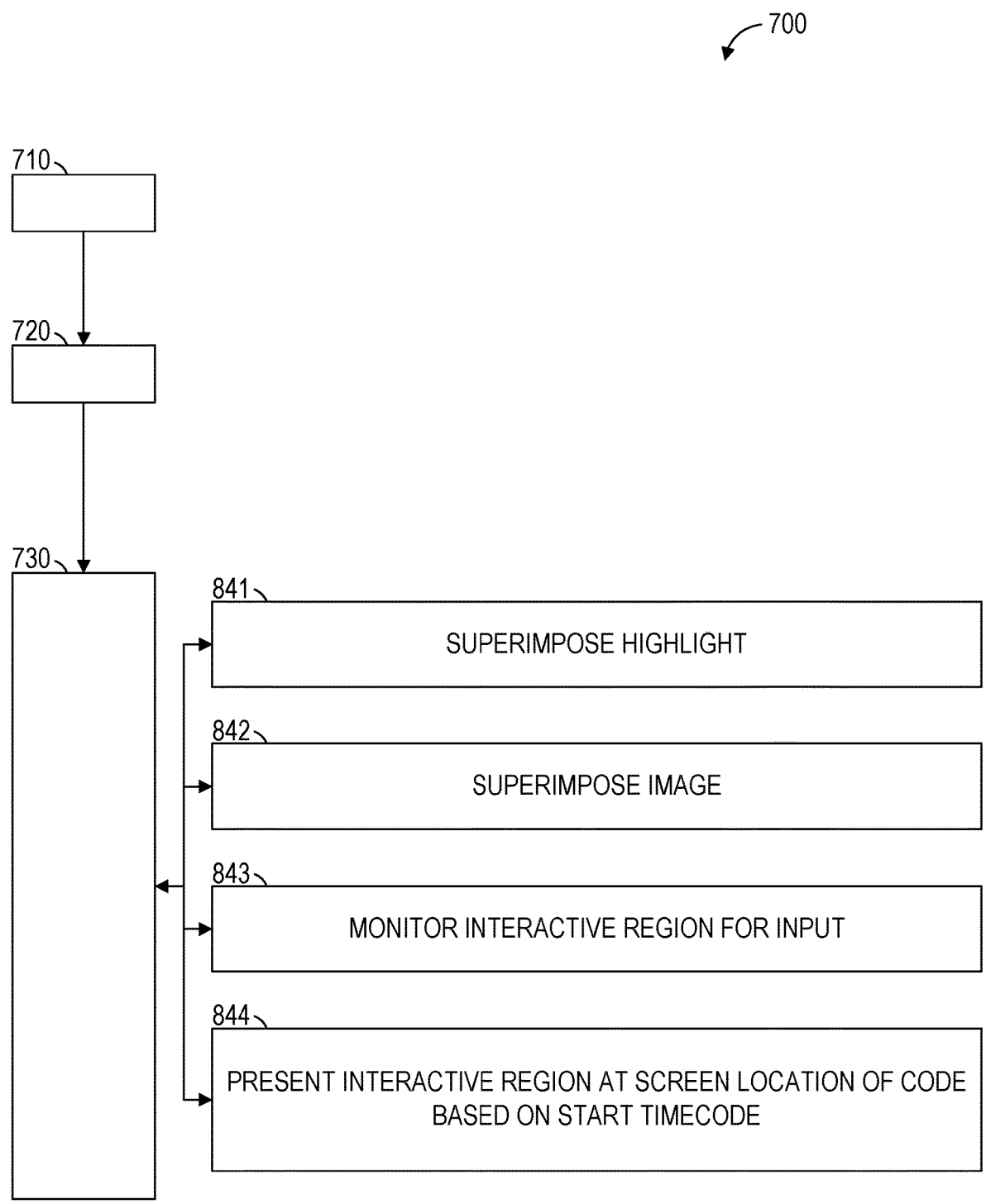

FIGS. 7 and 8 are flowcharts illustrating operations of the player device 130 in performing a method 700 of providing an interactive region based on an optically readable code, according to some example embodiments. Operations in the method 700 may be performed by the player device 130, using components (e.g., modules) described above with respect to FIG. 3, using one or more processors (e.g., microprocessors or other hardware processors), or using any suitable combination thereof. As shown in FIG. 7, the method 700 includes operations 710, 720, and 730.

In operation 710, the video accessor 310 accesses the video stream 400, which is being provided by a video server (e.g., the video server machine 110). The video server (e.g., an analysis initiated by the video server machine 110) is configured to analyze the video stream 400 and detect the optically readable code 420, which is depicted at a screen location throughout the set 410 of video frames within the video stream 400.

In operation 720, the command processor 320 receives a command generated by the video server (e.g., the video server machine 110), and the received command indicates the screen location of the optically readable code 420 depicted throughout the set 410 of video frames within the video stream 400 being provided by the video server.

In operation 730, the interaction processor 330 presents, in response to the command received in operation 720, an interactive region (e.g., after generating the interactive region, configuring the interactive region, or both) at the screen location of the optically readable code 420. The interaction processor 330 may present the interactive region throughout the entire set 410 of video frames that depict the optically readable code 420, and the interaction processor 330 may present the interactive region while the player device 130 also presents (e.g., displays) the video stream 400 that is being provided to the player device 130 by the video server.

The presented interactive region is activatable to initiate an action based on the optically readable code 420 depicted in the set 410 of video frames within the video stream 400. In some example embodiments, the optically readable code 420 encodes the action (e.g., encodes an identifier of the action) to be initiated in response to activation of the interactive region. In such example embodiments, the provided command indicates the action encoded by the optically readable code 420, and in response to detection of an activation input within the presented interactive region, the player device 130 (e.g., the interaction processor 330, one or more of its processors 399, or any suitable combination thereof) initiates the action encoded by the optically readable code 420.

In certain example embodiments, the optically readable code 420 encodes a network location (e.g., encodes a network address or other network locator) of data to be obtained and to be presented in response to activation of the interactive region. In such example embodiments, the provided command indicates the network location encoded by the optically readable code 420, and in response to detection of an activation input within the interactive region, the player device 130 (e.g., the interaction processor 330, one or more of its processors 399, or any suitable combination thereof) obtains and presents the data whose network location is encoded by the optically readable code 420.

As shown in FIG. 8, in addition to any one or more of the operations previously described for the method 700, the method 700 may include one or more of operations 841, 842, 843, and 844. One or more of operations 841, 842, 843, and 844 may be performed as part (e.g., a precursor task, a subroutine, or a portion) of operation 730, in which the interaction processor 330 presents (e.g., displays or causes display of) the interactive region.

In operation 841, the command received in operation 720 indicates that the optically readable code 420 is to be highlighted, and the interaction processor 330, as part of presenting the interactive region, superimposes (e.g., overlays) a highlight over the optically readable code 420, the interactive region, or both.

In operation 842, the command received in operation 720 indicates that the optically readable code 420 is to be replaced with a specified image (e.g., provided, identified, or otherwise specified by the command), and the interaction processor 330, as part of presenting of the interactive region, superimposes (e.g., overlays) the specified image over the optically readable code 420, the interactive region, or both.

In operation 843, the interaction processor 330, in response to the command received in operation 720, monitors the interactive region for an activation input caused by a viewer (e.g., user 132) of the video stream 400 and, in response to detection of the activation input within the interactive region, initiates the action based on the optically readable code 420 depicted in the set 410 of video frames within the video stream 400.

In operation 844, the command received in operation 720 indicates a start timecode of the set 410 of video frames that depict the optically readable code 420 within the video stream 400, and the interaction processor 330 presents (e.g., displays or causes display of) the interactive region at the screen location of the optically readable code 420 based on the start timecode of the set 410 of video frames.

According to various example embodiments, one or more of the methodologies described herein may facilitate provision of an interactive region based on an optically readable code. Moreover, one or more of the methodologies described herein may facilitate initiation of one or more actions based on activation of an interactive region that was provided based on an optically readable code. Hence, one or more of the methodologies described herein may facilitate performance (e.g., by a machine, such as by a video server machine, a player device, or any suitable combination thereof) of one or more actions initiated in response to activation of an interactive region that was provided based on an optically readable code, as well as provision of one or more beneficial results the one or more actions performed to completion, compared to capabilities of pre-existing systems and methods.

When these effects are considered in aggregate, one or more of the methodologies described herein may obviate a need for certain efforts or resources that otherwise would be involved in provision of an interactive region based on an optically readable code. Efforts expended by a user in manually providing an interactive region based on an optically readable code may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 9:
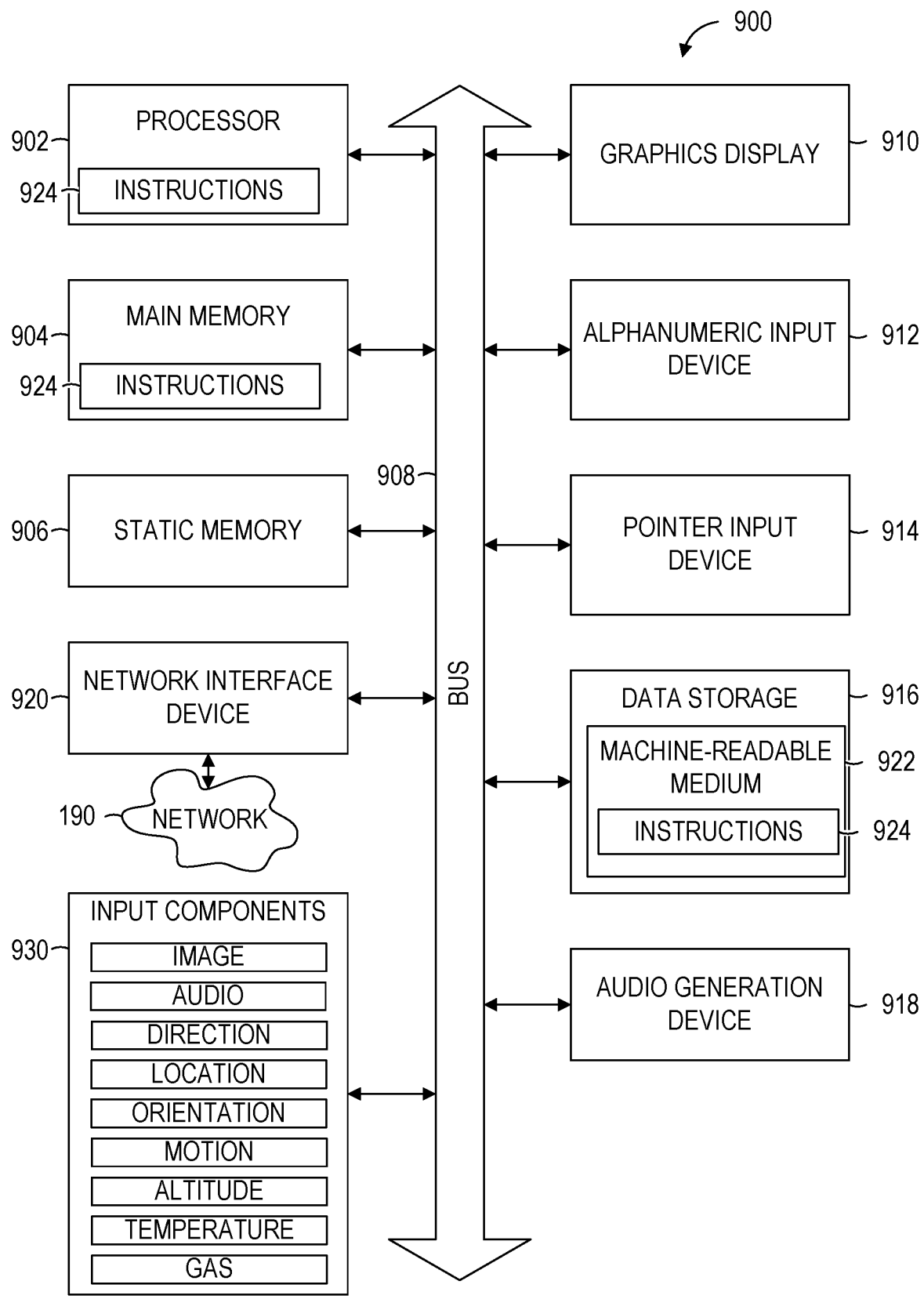
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be communicatively coupled (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 904, and a static memory 906, which are configured to communicate with each other via a bus 908. The processor 902 contains solid-state digital microcircuits (e.g., electronic, optical, or both) that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein. In some example embodiments, the processor 902 is a multicore CPU (e.g., a dual-core CPU, a quad-core CPU, an 8a-core CPU, or a 128-core CPU) within which each of multiple cores behaves as a separate processor that is able to perform any one or more of the methodologies discussed herein, in whole or in part. Although the beneficial effects described herein may be provided by the machine 900 with at least the processor 902, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a pointer input device 914 (e.g., a mouse, a touchpad, a touchscreen, a trackball, a joystick, a stylus, a motion sensor, an eye tracking device, a data glove, or other pointing instrument), a data storage 916, an audio generation device 918 (e.g., a sound card, an amplifier, a speaker, a headphone jack, or any suitable combination thereof), and a network interface device 920.

The data storage 916 (e.g., a data storage device) includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the static memory 906, within the processor 902 (e.g., within the processor's cache memory), or any suitable combination thereof, before or during execution thereof by the machine 900. Accordingly, the main memory 904, the static memory 906, and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device (e.g., a smart phone, a tablet computer, or a wearable device) and may have one or more additional input components 930 (e.g., sensors or gauges). Examples of such input components 930 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 930 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 924 for execution by the machine 900 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 924).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:
 initiating, by one or more processors, an analysis of a video stream to be provided to a player device, the analysis being configured to detect an optically readable code depicted at a screen location throughout a set of video frames within the video stream;

initiating, by one or more processors, provision of the video stream to the player device during the analysis configured to detect the optically readable code within the video stream;

generating, by the one or more processors, a command to control the player device, the generated command indicating the screen location of the optically readable code detected by the analysis and depicted throughout the set of video frames within the video stream; and controlling, by the one or more processors, the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

A second example provides a method according to the first example, wherein:

the generated command indicates that the optically readable code is to be highlighted; and the provided generated command causes the player device to superimpose a highlight over at least one of the optically readable code or the interactive region.

A third example provides a method according to the first example or the second example, wherein:

the generated command indicates that the optically readable code is to be replaced with a specified image; and the provided generated command causes the player device to superimpose the specified image over at least one of the optically readable code or the interactive region.

A fourth example provides a method according to any of the first through third examples, wherein:

the generated command causes the player device to monitor the interactive region for an activation input caused by a viewer of the video stream; and in response to detection of the activation input within the interactive region, the player device initiates the action based on the optically readable code depicted in the set of video frames within the video stream.

A fifth example provides a method according to any of the first through fourth examples, wherein:

the generated command indicates a start timecode of the set of video frames that depict the optically readable code within the video stream; and the provided generated command causes the player device to present the interactive region at the screen location of the optically readable code based on the start timecode of the set of video frames.

A sixth example provides a method according to any of the first through fifth examples, wherein:

the optically readable code encodes the action to be initiated in response to activation of the interactive region;

the provided generated command indicates the action encoded by the optically readable code; and in response to detection of an activation input within the interactive region, the player device initiates the action encoded by the optically readable code.

A seventh example provides a method according to any of the first through sixth examples, wherein:

the optically readable code encodes a network location of data to be obtained and presented in response to activation of the interactive region;

the provided generated command indicates the network location encoded by the optically readable code; and in response to detection of an activation input within the interactive region, the player device obtains and presents the data whose network location is encoded by the optically readable code.

An eighth example provides a method comprising:

accessing, by one or more processors, a video stream being provided by a video server configured to analyze the video stream and detect an optically readable code depicted at a screen location throughout a set of video frames within the video stream;

receiving, by the one or more processors, a command generated by the video server, the received command indicating the screen location of the optically readable code depicted throughout the set of video frames within the video stream being provided by the video server; and presenting, by the one or more processors and in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

A ninth example provides a method according to the eighth example, wherein:

the received command indicates that the optically readable code is to be highlighted; and the presenting of the interactive region includes superimposing a highlight over at least one of the optically readable code or the interactive region.

A tenth example provides a method according to the eighth example or the ninth example, wherein:

the received command indicates that the optically readable code is to be replaced with a specified image; and the presenting of the interactive region includes superimposing the specified image over at least one of the optically readable code or the interactive region.

An eleventh example provides a method according to any of the eighth through tenth examples, further comprising:

in response to the received command, monitoring the interactive region for an activation input caused by a viewer of the video stream; and in response to detection of the activation input within the interactive region, initiating the action based on the optically readable code depicted in the set of video frames within the video stream.

A twelfth example provides a method according to any of the eighth through eleventh examples, wherein:

the received command indicates a start timecode of the set of video frames that depict the optically readable code within the video stream; and the presenting of the interactive region at the screen location of the optically readable code is based on the start timecode of the set of video frames.

A thirteenth example provides a method according to any of the eighth through twelfth examples, wherein:

the optically readable code encodes the action to be initiated in response to activation of the interactive region;

the received command indicates the action encoded by the optically readable code; and in response to detection of an activation input within the interactive region, initiating the action encoded by the optically readable code.

A fourteenth example provides a method according to any of the eighth through thirteenth examples, wherein:
the optically readable code encodes a network location of data to be obtained and presented in response to activation of the interactive region;
the received command indicates the network location encoded by the optically readable code; and
in response to detection of an activation input within the interactive region, obtaining and presenting the data whose network location is encoded by the optically readable code.

A fifteenth example provides a machine-readable medium (e.g., a non-transitory machine-readable storage medium) comprising instructions that, when executed by one or more processors of a machine, cause the machine to perform operations comprising:
initiating an analysis of a video stream to be provided to a player device, the analysis being configured to detect an optically readable code depicted at a screen location throughout a set of video frames within the video stream;
initiating provision of the video stream to the player device during the analysis configured to detect the optically readable code within the video stream;
generating a command to control the player device, the generated command indicating the screen location of the optically readable code detected by the analysis and depicted throughout the set of video frames within the video stream; and
controlling the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

A sixteenth example provides a machine-readable medium according to the fifteenth example, wherein:
the generated command indicates that the optically readable code is to be highlighted; and
the provided generated command causes the player device to superimpose a highlight over at least one of the optically readable code or the interactive region.

A seventeenth example provides a machine-readable medium according to the fifteenth example or the sixteenth example, wherein:
the generated command indicates that the optically readable code is to be replaced with a specified image; and
the provided generated command causes the player device to superimpose the specified image over at least one of the optically readable code or the interactive region.

An eighteenth example provides a machine-readable medium according to any of the fifteenth through seventeenth examples, wherein:
the generated command causes the player device to monitor the interactive region for an activation input caused by a viewer of the video stream; and
in response to detection of the activation input within the interactive region, the player device initiates the action based on the optically readable code depicted in the set of video frames within the video stream.

A nineteenth example provides a machine-readable medium according to any of the fifteenth through eighteenth examples, wherein:
the generated command indicates a start timecode of the set of video frames that depict the optically readable code within the video stream; and
the provided generated command causes the player device to present the interactive region at the screen location of the optically readable code based on the start timecode of the set of video frames.

A twentieth example provides a machine-readable medium according to any of the fifteenth through nineteenth examples, wherein:
the optically readable code encodes the action to be initiated in response to activation of the interactive region;
the provided generated command indicates the action encoded by the optically readable code; and
in response to detection of an activation input within the interactive region, the player device initiates the action encoded by the optically readable code.

A twenty-first example provides a machine-readable medium according to any of the fifteenth through twentieth examples, wherein:
the optically readable code encodes a network location of data to be obtained and presented in response to activation of the interactive region;
the provided generated command indicates the network location encoded by the optically readable code; and
in response to detection of an activation input within the interactive region, the player device obtains and presents the data whose network location is encoded by the optically readable code.

A twenty-second example provides a machine-readable medium (e.g., a non-transitory machine-readable storage medium) comprising instructions that, when executed by one or more processors of a machine, cause the machine to perform operations comprising:
accessing a video stream being provided by a video server configured to analyze the video stream and detect an optically readable code depicted at a screen location throughout a set of video frames within the video stream;
receiving a command generated by the video server, the received command indicating the screen location of the optically readable code depicted throughout the set of video frames within the video stream being provided by the video server; and
presenting, in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

A twenty-third example provides a machine-readable medium according to the twenty-second example, wherein:
the received command indicates that the optically readable code is to be highlighted; and
the presenting of the interactive region includes superimposing a highlight over at least one of the optically readable code or the interactive region.

A twenty-fourth example provides a machine-readable medium according to the twenty-second example or the twenty-third example, wherein:

the received command indicates that the optically readable code is to be replaced with a specified image; and the presenting of the interactive region includes superimposing the specified image over at least one of the optically readable code or the interactive region.

A twenty-fifth example provides a machine-readable medium according to any of the twenty-second through twenty-fourth examples, wherein the operations further comprise:

in response to the received command, monitoring the interactive region for an activation input caused by a viewer of the video stream; and in response to detection of the activation input within the interactive region, initiating the action based on the optically readable code depicted in the set of video frames within the video stream.

A twenty-sixth example provides a machine-readable medium according to any of the twenty-second through twenty-fifth examples, wherein:

the received command indicates a start timecode of the set of video frames that depict the optically readable code within the video stream; and the presenting of the interactive region at the screen location of the optically readable code is based on the start timecode of the set of video frames.

A twenty-seventh example provides a machine-readable medium according to any of the twenty-second through twenty-sixth examples, wherein:

the optically readable code encodes the action to be initiated in response to activation of the interactive region;

the received command indicates the action encoded by the optically readable code; and in response to detection of an activation input within the interactive region, initiating the action encoded by the optically readable code.

A twenty-eighth example provides a machine-readable medium according to any of the twenty-second through twenty-seventh examples, wherein:

the optically readable code encodes a network location of data to be obtained and presented in response to activation of the interactive region;

the received command indicates the network location encoded by the optically readable code; and in response to detection of an activation input within the interactive region, obtaining and presenting the data whose network location is encoded by the optically readable code.

A twenty-ninth example provides a system (e.g., a computer system) comprising:

one or more processors; and a memory storing instructions that, when executed by at least one processor among the one or more processors, cause the system to perform operations comprising:

initiating an analysis of a video stream to be provided to a player device, the analysis being configured to detect an optically readable code depicted at a screen location throughout a set of video frames within the video stream;

initiating provision of the video stream to the player device during the analysis configured to detect the optically readable code within the video stream;

generating a command to control the player device, the generated command indicating the screen location of the optically readable code detected by the analysis and depicted throughout the set of video frames within the video stream; and controlling the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

A thirtieth example provides a system according to the twenty-ninth example, wherein:

the generated command indicates that the optically readable code is to be highlighted; and the provided generated command causes the player device to superimpose a highlight over at least one of the optically readable code or the interactive region.

A thirty-first example provides a system according to the twenty-ninth example or the thirtieth example, wherein:

the generated command indicates that the optically readable code is to be replaced with a specified image; and the provided generated command causes the player device to superimpose the specified image over at least one of the optically readable code or the interactive region.

A thirty-second example provides a system according to any of the twenty-ninth through thirty-first examples, wherein:

the generated command causes the player device to monitor the interactive region for an activation input caused by a viewer of the video stream; and in response to detection of the activation input within the interactive region, the player device initiates the action based on the optically readable code depicted in the set of video frames within the video stream.

A thirty-third example provides a system according to any of the twenty-ninth through thirty-second examples, wherein:

the generated command indicates a start timecode of the set of video frames that depict the optically readable code within the video stream; and the provided generated command causes the player device to present the interactive region at the screen location of the optically readable code based on the start timecode of the set of video frames.

A thirty-fourth example provides a system according to any of the twenty-ninth through thirty-third examples, wherein:

the optically readable code encodes the action to be initiated in response to activation of the interactive region;

the provided generated command indicates the action encoded by the optically readable code; and in response to detection of an activation input within the interactive region, the player device initiates the action encoded by the optically readable code.

A thirty-fifth example provides a system according to any of the twenty-ninth through a thirty-fourth examples, wherein:

the optically readable code encodes a network location of data to be obtained and presented in response to activation of the interactive region;

the provided generated command indicates the network location encoded by the optically readable code; and in response to detection of an activation input within the interactive region, the player device obtains and presents the data whose network location is encoded by the optically readable code.

A thirty-sixth provides a system (e.g., a computer system) comprising:
one or more processors; and
a memory storing instructions that, when executed by at least one processor among the one or more processors, cause the system to perform operations comprising:
accessing a video stream being provided by a video server configured to analyze the video stream and detect an optically readable code depicted at a screen location throughout a set of video frames within the video stream;
receiving a command generated by the video server, the received command indicating the screen location of the optically readable code depicted throughout the set of video frames within the video stream being provided by the video server; and
presenting, in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

A thirty-seventh example provides a system according to the thirty-sixth example, wherein:
the received command indicates that the optically readable code is to be highlighted; and
the presenting of the interactive region includes superimposing a highlight over at least one of the optically readable code or the interactive region.

A thirty-eighth example provides a system according to the thirty-sixth example or the thirty-seventh example, wherein:
the received command indicates that the optically readable code is to be replaced with a specified image; and
the presenting of the interactive region includes superimposing the specified image over at least one of the optically readable code or the interactive region.

A thirty-ninth example provides a system according to any of the thirty-sixth through thirty-eighth examples, wherein the operations further comprise:
in response to the received command, monitoring the interactive region for an activation input caused by a viewer of the video stream; and
in response to detection of the activation input within the interactive region, initiating the action based on the optically readable code depicted in the set of video frames within the video stream.

A fortieth example provides a system according to any of the thirty-sixth through thirty-ninth examples, wherein:
the received command indicates a start timecode of the set of video frames that depict the optically readable code within the video stream; and
the presenting of the interactive region at the screen location of the optically readable code is based on the start timecode of the set of video frames.

A forty-first example provides a system according to any of the thirty-sixth through fortieth examples, wherein:
the optically readable code encodes the action to be initiated in response to activation of the interactive region;
the received command indicates the action encoded by the optically readable code; and
in response to detection of an activation input within the interactive region, initiating the action encoded by the optically readable code.

A forty-second example provides a system according to any of the thirty-sixth through forty-first examples, wherein:
the optically readable code encodes a network location of data to be obtained and presented in response to activation of the interactive region;
the received command indicates the network location encoded by the optically readable code; and
in response to detection of an activation input within the interactive region, obtaining and presenting the data whose network location is encoded by the optically readable code.

A forty-third example provides a carrier medium carrying machine-readable instructions for controlling a machine to carry out the operations (e.g., method operations) performed in any one of the previously described examples.

What is claimed is:

1. A method comprising:
initiating, by one or more processors, an analysis of a video stream to be provided to a player device, the analysis being configured to detect an optically readable code depicted at a screen location throughout a set of video frames within the video stream;
initiating, by one or more processors, provision of the video stream to the player device during the analysis configured to detect the optically readable code within the video stream;
generating, by the one or more processors, a command to control the player device, the generated command indicating the screen location of the optically readable code detected by the analysis and depicted throughout the set of video frames within the video stream; and
controlling, by the one or more processors, the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

2. The method of claim 1, wherein:
the generated command indicates that the optically readable code is to be highlighted; and
the provided generated command causes the player device to superimpose a highlight over at least one of the optically readable code or the interactive region.

3. The method of claim 1, wherein:
the generated command indicates that the optically readable code is to be replaced with a specified image; and
the provided generated command causes the player device to superimpose the specified image over at least one of the optically readable code or the interactive region.

4. The method of claim 1, wherein:
the generated command causes the player device to monitor the interactive region for an activation input caused by a viewer of the video stream; and
in response to detection of the activation input within the interactive region, the player device initiates the action based on the optically readable code depicted in the set of video frames within the video stream.

5. The method of claim 1, wherein:
the generated command indicates a start timecode of the set of video frames that depict the optically readable code within the video stream; and the provided generated command causes the player device to present the interactive region at the screen location of the optically readable code based on the start timecode of the set of video frames.

6. The method of claim 1, wherein:
the optically readable code encodes the action to be initiated in response to activation of the interactive region;
the provided generated command indicates the action encoded by the optically readable code; and
in response to detection of an activation input within the interactive region, the player device initiates the action encoded by the optically readable code.

7. The method of claim 1, wherein:
the optically readable code encodes a network location of data to be obtained and presented in response to activation of the interactive region;
the provided generated command indicates the network location encoded by the optically readable code; and
in response to detection of an activation input within the interactive region, the player device obtains and presents the data whose network location is encoded by the optically readable code.

8. A method comprising:
accessing, by one or more processors, a video stream being provided by a video server configured to analyze the video stream and detect an optically readable code depicted at a screen location throughout a set of video frames within the video stream;
receiving, by the one or more processors, a command generated by the video server, the received command indicating the screen location of the optically readable code depicted throughout the set of video frames within the video stream being provided by the video server; and
presenting, by the one or more processors and in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

9. The method of claim 8, wherein:
the received command indicates that the optically readable code is to be highlighted; and
the presenting of the interactive region includes superimposing a highlight over at least one of the optically readable code or the interactive region.

10. The method of claim 8, wherein:
the received command indicates that the optically readable code is to be replaced with a specified image; and
the presenting of the interactive region includes superimposing the specified image over at least one of the optically readable code or the interactive region.

11. The method of claim 8, further comprising:
in response to the received command, monitoring the interactive region for an activation input caused by a viewer of the video stream; and
in response to detection of the activation input within the interactive region, initiating the action based on the optically readable code depicted in the set of video frames within the video stream.

12. The method of claim 8, wherein:
the received command indicates a start timecode of the set of video frames that depict the optically readable code within the video stream; and
the presenting of the interactive region at the screen location of the optically readable code is based on the start timecode of the set of video frames.

13. The method of claim 8, wherein:
the optically readable code encodes the action to be initiated in response to activation of the interactive region;
the received command indicates the action encoded by the optically readable code; and the method further comprises:
in response to detection of an activation input within the interactive region, initiating the action encoded by the optically readable code.

14. The method of claim 8, wherein:
the optically readable code encodes a network location of data to be obtained and presented in response to activation of the interactive region;
the received command indicates the network location encoded by the optically readable code; and the method further comprises:
in response to detection of an activation input within the interactive region, obtaining and presenting the data whose network location is encoded by the optically readable code.

15. A non-transitory machine-readable storage medium comprising instructions that, when executed by one or more processors of a machine, cause the machine to perform operations comprising:
initiating an analysis of a video stream to be provided to a player device, the analysis being configured to detect an optically readable code depicted at a screen location throughout a set of video frames within the video stream;
initiating provision of the video stream to the player device during the analysis configured to detect the optically readable code within the video stream;
generating a command to control the player device, the generated command indicating the screen location of the optically readable code detected by the analysis and depicted throughout the set of video frames within the video stream; and
controlling the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

16. The non-transitory machine-readable storage medium of claim 15, wherein:
the generated command indicates that the optically readable code is to be highlighted; and
the provided generated command causes the player device to superimpose a highlight over at least one of the optically readable code or the interactive region.

17. The non-transitory machine-readable storage medium of claim 15, wherein:
the generated command indicates that the optically readable code is to be replaced with a specified image; and the provided generated command causes the player device to superimpose the specified image over at least one of the optically readable code or the interactive region.

18. The non-transitory machine-readable storage medium of claim 15, wherein:
the generated command causes the player device to monitor the interactive region for an activation input caused by a viewer of the video stream; and
in response to detection of the activation input within the interactive region, the player device initiates the action based on the optically readable code depicted in the set of video frames within the video stream.

19. The non-transitory machine-readable storage medium of claim 15, wherein:
the generated command indicates a start timecode of the set of video frames that depict the optically readable code within the video stream; and
the provided generated command causes the player device to present the interactive region at the screen location of the optically readable code based on the start timecode of the set of video frames.

20. The non-transitory machine-readable storage medium of claim 15, wherein:
the optically readable code encodes the action to be initiated in response to activation of the interactive region;
the provided generated command indicates the action encoded by the optically readable code; and
in response to detection of an activation input within the interactive region, the player device initiates the action encoded by the optically readable code.

21. The non-transitory machine-readable storage medium of claim 15, wherein:
the optically readable code encodes a network location of data to be obtained and presented in response to activation of the interactive region;
the provided generated command indicates the network location encoded by the optically readable code; and
in response to detection of an activation input within the interactive region, the player device obtains and presents the data whose network location is encoded by the optically readable code.

22. A non-transitory machine-readable storage medium comprising instructions that, when executed by one or more processors of a machine, cause the machine to perform operations comprising:
accessing a video stream being provided by a video server configured to analyze the video stream and detect an optically readable code depicted at a screen location throughout a set of video frames within the video stream;
receiving a command generated by the video server, the received command indicating the screen location of the optically readable code depicted throughout the set of video frames within the video stream being provided by the video server; and
presenting, in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

23. The non-transitory machine-readable storage medium of claim 22, wherein:
the received command indicates that the optically readable code is to be highlighted; and
the presenting of the interactive region includes superimposing a highlight over at least one of the optically readable code or the interactive region.

24. The non-transitory machine-readable storage medium of claim 22, wherein:
the received command indicates that the optically readable code is to be replaced with a specified image; and
the presenting of the interactive region includes superimposing the specified image over at least one of the optically readable code or the interactive region.

25. The non-transitory machine-readable storage medium of claim 22, wherein the operations further comprise:
in response to the received command, monitoring the interactive region for an activation input caused by a viewer of the video stream; and
in response to detection of the activation input within the interactive region, initiating the action based on the optically readable code depicted in the set of video frames within the video stream.

26. The non-transitory machine-readable storage medium of claim 22, wherein:
the received command indicates a start timecode of the set of video frames that depict the optically readable code within the video stream; and
the presenting of the interactive region at the screen location of the optically readable code is based on the start timecode of the set of video frames.

27. The non-transitory machine-readable storage medium of claim 22, wherein:
the optically readable code encodes the action to be initiated in response to activation of the interactive region;
the received command indicates the action encoded by the optically readable code; and the operations further comprise:
in response to detection of an activation input within the interactive region, initiating the action encoded by the optically readable code.

28. The non-transitory machine-readable storage medium of claim 22, wherein:
the optically readable code encodes a network location of data to be obtained and presented in response to activation of the interactive region;
the received command indicates the network location encoded by the optically readable code; and the operations further comprise:
in response to detection of an activation input within the interactive region, obtaining and presenting the data whose network location is encoded by the optically readable code.

29. A system comprising:
one or more processors; and
a memory storing instructions that, when executed by at least one processor among the one or more processors, cause the system to perform operations comprising:
initiating an analysis of a video stream to be provided to a player device, the analysis being configured to detect an optically readable code depicted at a screen location throughout a set of video frames within the video stream;
initiating provision of the video stream to the player device during the analysis configured to detect the optically readable code within the video stream;
generating a command to control the player device, the generated command indicating the screen location of the optically readable code detected by the analysis and depicted throughout the set of video frames within the video stream; and controlling the player device by providing the generated command to the player device, the provided generated command causing the player device to present an interactive region at the screen location of the optically readable code throughout the set of video frames that depict the optically readable code while the player device presents the video stream being provided to the player device, the presented interactive region being activatable to initiate an action based on the optically readable code depicted in the set of video frames.

30. The system of claim 29, wherein:

the generated command indicates that the optically readable code is to be highlighted; and the provided generated command causes the player device to superimpose a highlight over at least one of the optically readable code or the interactive region.

31. The system of claim 29, wherein:

the generated command indicates that the optically readable code is to be replaced with a specified image; and the provided generated command causes the player device to superimpose the specified image over at least one of the optically readable code or the interactive region.

32. The system of claim 29, wherein:

the generated command causes the player device to monitor the interactive region for an activation input caused by a viewer of the video stream; and in response to detection of the activation input within the interactive region, the player device initiates the action based on the optically readable code depicted in the set of video frames within the video stream.

33. The system of claim 29, wherein:

the generated command indicates a start timecode of the set of video frames that depict the optically readable code within the video stream; and the provided generated command causes the player device to present the interactive region at the screen location of the optically readable code based on the start timecode of the set of video frames.

34. The system of claim 29, wherein:

the optically readable code encodes the action to be initiated in response to activation of the interactive region;

the provided generated command indicates the action encoded by the optically readable code; and in response to detection of an activation input within the interactive region, the player device initiates the action encoded by the optically readable code.

35. The system of claim 29, wherein:

the optically readable code encodes a network location of data to be obtained and presented in response to activation of the interactive region;

the provided generated command indicates the network location encoded by the optically readable code; and in response to detection of an activation input within the interactive region, the player device obtains and presents the data whose network location is encoded by the optically readable code.

36. A system comprising:

one or more processors; and a memory storing instructions that, when executed by at least one processor among the one or more processors, cause the system to perform operations comprising:

accessing a video stream being provided by a video server configured to analyze the video stream and detect an optically readable code depicted at a screen location throughout a set of video frames within the video stream;

receiving a command generated by the video server, the received command indicating the screen location of the optically readable code depicted throughout the set of video frames within the video stream being provided by the video server; and presenting, in response to the received command, an interactive region at the screen location of the optically readable code throughout the set of video frames that depict the optically readable code while presenting the accessed video stream that is being provided by the video server, the presented interactive region being activatable to initiate an action based on the optically readable code depicted in the set of video frames.

37. The system of claim 36, wherein:

the received command indicates that the optically readable code is to be highlighted; and the presenting of the interactive region includes superimposing a highlight over at least one of the optically readable code or the interactive region.

38. The system of claim 36, wherein:

the received command indicates that the optically readable code is to be replaced with a specified image; and the presenting of the interactive region includes superimposing the specified image over at least one of the optically readable code or the interactive region.

39. The system of claim 36, wherein the operations further comprise:

in response to the received command, monitoring the interactive region for an activation input caused by a viewer of the video stream; and in response to detection of the activation input within the interactive region, initiating the action based on the optically readable code depicted in the set of video frames within the video stream.

40. The system of claim 36, wherein:

the received command indicates a start timecode of the set of video frames that depict the optically readable code within the video stream; and the presenting of the interactive region at the screen location of the optically readable code is based on the start timecode of the set of video frames.

41. The system of claim 36, wherein:

the optically readable code encodes the action to be initiated in response to activation of the interactive region;

the received command indicates the action encoded by the optically readable code; and the operations further comprise:

in response to detection of an activation input within the interactive region, initiating the action encoded by the optically readable code.

42. The system of claim 36, wherein:

the optically readable code encodes a network location of data to be obtained and presented in response to activation of the interactive region;

the received command indicates the network location encoded by the optically readable code; and the operations further comprise:

in response to detection of an activation input within the interactive region, obtaining and presenting the data whose network location is encoded by the optically readable code.

* * * * *

UNITED STATES PATENT AND TRADEMARK OFFICE
CERTIFICATE OF CORRECTION

PATENT NO. : 12,307,326 B2  
APPLICATION NO. : 18/473685  
DATED : May 20, 2025  
INVENTOR(S) : Reitmeyer et al.

Page 1 of 1

It is certified that error appears in the above-identified patent and that said Letters Patent is hereby corrected as shown below:

In the Specification

In Column 10, Line 59, delete "8a-core" and insert --8-core-- therefor

Signed and Sealed this  
Second Day of September, 2025

Coke Morgan Stewart  
*Acting Director of the United States Patent and Trademark Office*